Figure 3:
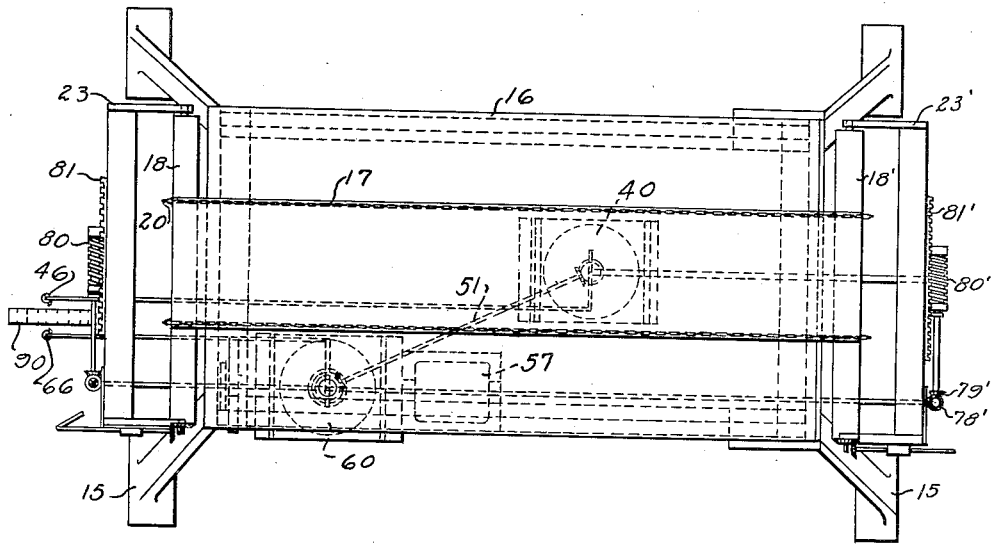

Oct. 26, 1948.  C. J. CRANE  2,452,039
APPARATUS FOR SIMULATING WIND EFFECTS IN
AVIATION GROUND TRAINERS
Filed March 12, 1940  3 Sheets-Sheet 1
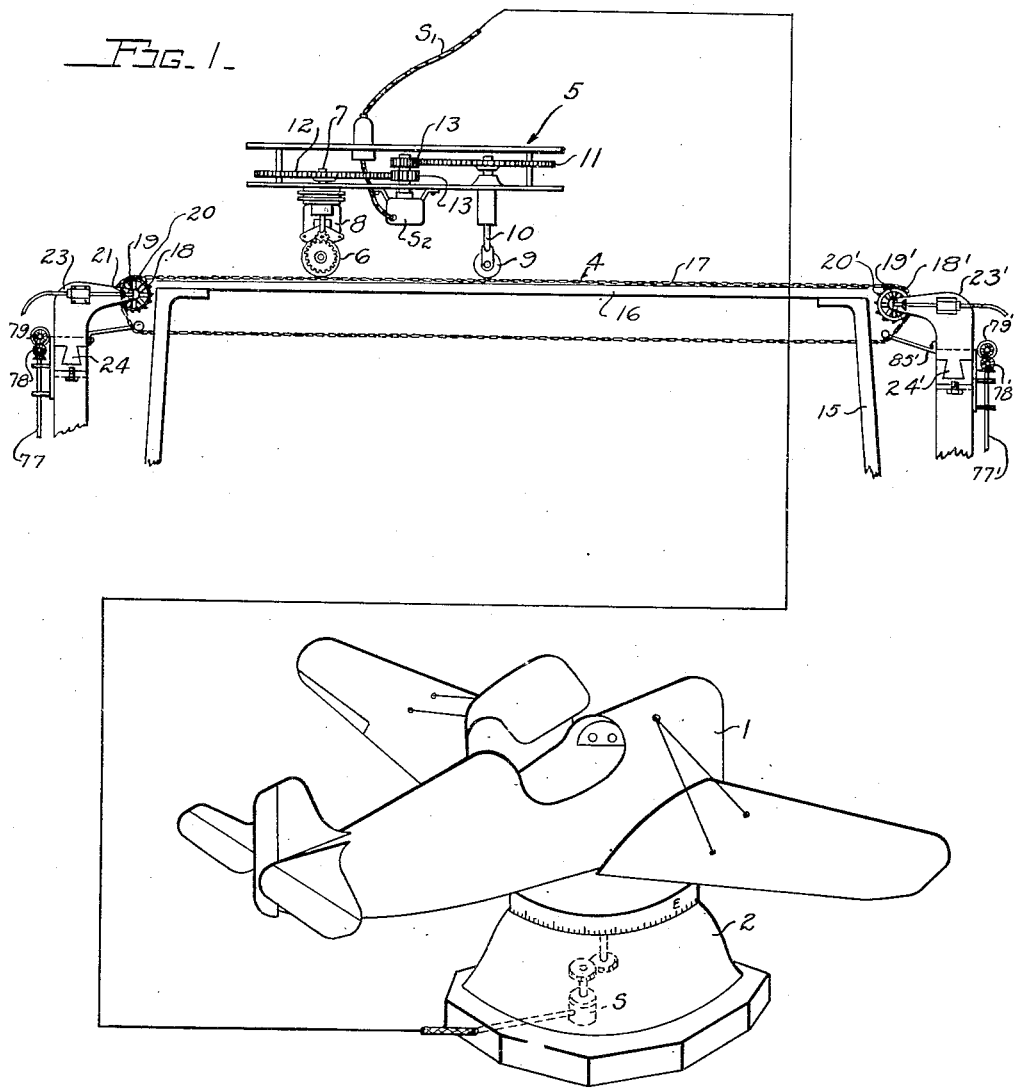
INVENTOR
CARL J. CRANE Oct. 26, 1948.   C. J. CRANE   2,452,039
APPARATUS FOR SIMULATING WIND EFFECTS IN
AVIATION GROUND TRAINERS
Filed March 12, 1940   3 Sheets-Sheet 2

INVENTOR
CARL J. CRANE

Oct. 26, 1948.  C. J. CRANE  2,452,039
APPARATUS FOR SIMULATING WIND EFFECTS IN
AVIATION GROUND TRAINERS
Filed March 12, 1940  3 Sheets-Sheet 3

INVENTOR
CARL J. CRANE

Patented Oct. 26, 1948

2,452,039

UNITED STATES PATENT OFFICE 2,452,039

APPARATUS FOR SIMULATING WIND EFFECTS IN AVIATION GROUND TRAINERS

Carl J. Crane, Dayton, Ohio

Application March 12, 1940, Serial No. 323,562

7 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for introducing the effect of a simulated wind, in aviation ground training devices and more particularly relates to a means for causing a reference surface to have a movement in two directions simultaneously, the resultant motion having a direction and velocity equivalent to a simulated wind. The reference surface supports a course indicator, or automatic course recorder, used in conjunction with aviation ground trainers and the moving reference surface thus bodily displaces the course indicator in the direction of the simulated wind and at a velocity proportional thereto. The displacement of the course indicator is equivalent to the drift effect, which would be caused by a simulated wind acting on the ground trainer.

Aviation ground trainers for instructing students in the art of blind flying are well known and generally comprise a grounded dummy aircraft, tiltably and rotatably mounted on a base and provided with a control system actuated by the occupant of the trainer, so that the trainer may be made to execute all of the normal flight maneuvers of an aircraft in flight. The trainer is provided with the usual instruments to indicate to the occupant of the trainer, the instant flight attitude of the trainer. For a more detailed description of one form of trainer known as the "Link" trainer, reference may be had to United States Patents No. 1,825,462 and No. 2,099,857 granted to Edwin A. Link, Jr.

Automatic course indicators, or recorders, are generally employed in conjunction with aviation ground trainers, to indicate the instant course of the trainer relative to a chart, which is a map of the terrain over which the trainer is assumed to be flying. The recorder, or course indicator, comprises a frame movably supported on rollers, generally three in number. At least two of the rollers are driven by small electric motors at an adjustable constant speed, so as to impart a translatory movement to the course indicator, over the record table surface. The rollers are steerable and interconnected by gearing to the receiver of an electric motion transmission system. The motion receiver is electrically connected to a corresponding transmitter, which is controlled by the trainer as it changes its heading. The arrangement is such, that the course indicator has a velocity proportional to the simulated flight velocity of the trainer and directionally controlled by the trainer, so that the heading of the course indicator corresponds to the instant heading of the trainer.

The third roller of the course indicator may be inked by a felt pad, or other suitable means, to leave a trace of the path traversed by the indicator on the chart over which the indicator moves. The point of contact of the marker wheel with the chart serves as a visual position indicator and the term course indicator is intended to apply to the device irrespective of whether the marker wheel is employed as a recording element.

For a more detailed description of one type of course indicator similar to that above described, reference may be made to United States Patent No. 2,179,663 granted to Edwin A. Link, Jr.

In the solution of problems in ground trainers, the position of the course indicator on the reference chart is transmitted to the student in the trainer cockpit by the actuation of a signal system, which simulates the signals of a radio range, or other radio navigational aid. The signal system may be manually actuated by the instructor in accordance with the observed position of the course indicator marker wheel, or automatically actuated in various ways, one of which is disclosed in my copending application Serial No. 327,003, filed March 30, 1940. Since the position of the course indicator relative to a point on the reference surface, or record table, represents the position of the ground trainer in its simulated flight, a displacement of the course indicator apart from its own movement, relative to the reference surface, can be made to represent the effect of a wind acting on the trainer during its simulated flight and thus further enhance the instruction value of the trainer, by more closely approaching actual flying conditions.

The principal object of the invention is the provision in an aviation ground trainer assembly, comprising a ground trainer for simulating the flight of an aircraft, a reference surface and a course indicator movable relative to said reference surface at a velocity proportional to the simulated velocity of said trainer and directionally controlled by the trainer; of a means to cause a simultaneous longitudinal and transverse motion of said reference surface, the resultant motion of said reference surface representing the equivalent magnitude and direction of a simulated wind acting on the trainer.

A further object of the invention is the provision of a movable surface for displacing an aviation ground trainer course indicator, in a direction and at a velocity representing the magnitude and direction of a simulated wind and a means to move the surface longitudinally and transversely at respective adjustable rates, so that the resultant motion of said surface may be made to represent a simulated wind blowing from any direction at a desired velocity.

Figure 2:
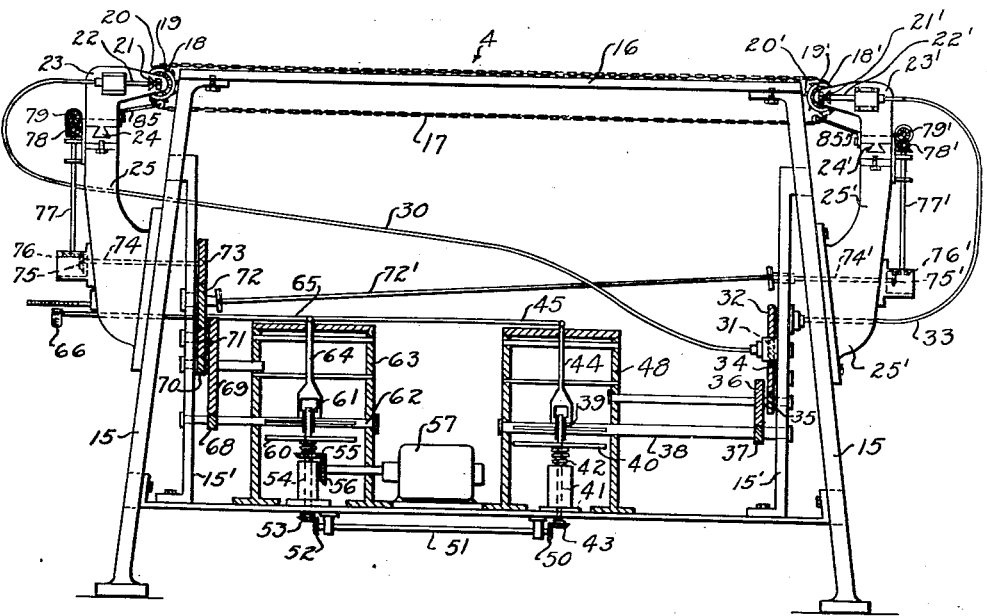
Figure 4:
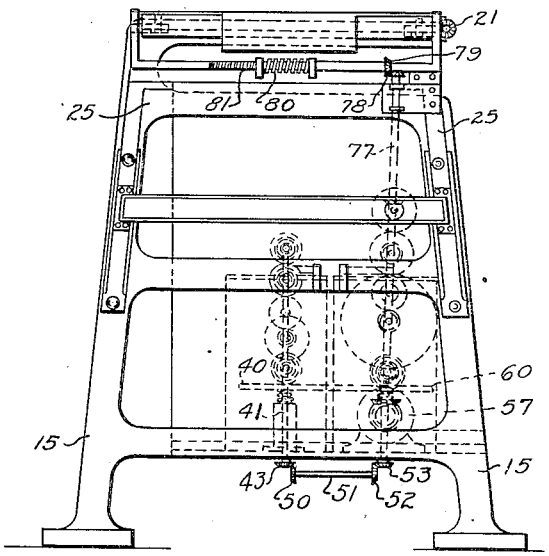
Figure 5:
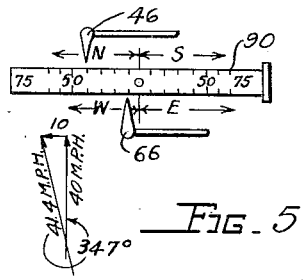

Other objects of the invention will become apparent by reference to the specification and the appended drawings in which:

Fig. 1 illustrates schematically the assembly of the components of the invention including the ground trainer; and Fig. 2 illustrates partly in section a side elevation of the novel mechanism employed in the device of Fig. 1 for simulating wind effects; and Fig. 3 is a top plan view of the device illustrated in Fig. 2; and Fig. 4 is an end view of the device illustrated in Fig. 2; and Fig. 5 illustrates a setting of the control mechanism of the device of Figs. 2, 3 and 4.

Referring to Fig. 1, the numeral 1 illustrates an aviation ground trainer of the type above described, tiltable and rotatable about the base 2, and provided with power means controlled from the trainer cockpit to simulate the normal flight maneuvers of an aircraft. The rotation of the trainer in about a vertical axis causes rotation of the rotor of a "selsyn," or other type electric motion transmitter S, electrically connected by conductors S1, to a receiver S2, mounted on the frame of the course indicator 5, which is movable over the surface of the movable record surface assembly generally indicated by the numeral 4. The course indicator, or recorder 5, is provided with a pair of supporting rollers 6, pivotally supported on shafts 7, which are rotatably mounted in the frame of the indicator. The rollers 6, are driven at a constant speed proportional to the simulated flight velocity of the trainer by small electric motors 8, rotatably mounted with the shafts 7 and energized from a suitable power source (not shown). A third supporting roller 9, is mounted on the shaft 10, which is also steerably mounted in the frame of the course indicator 5. The third roller, when inked, serves as a marker wheel to trace the indicator's path on the record surface. Each of shafts 7, is provided with a gear 12, mounted on the upper ends thereof and shaft 10, is similarly provided with a gear 11, the gears 11 and 12, meshing with pinion gears 13, rotated by the "selsyn" receiver S2, when the trainer 1, changes its azimuth heading. The course indicator 5 is thus movable over the record surface at a velocity proportional to the simulated velocity of the trainer and also directionally controlled by the trainer, so that the heading of the course indicator at all times corresponds to the heading of the trainer.

Referring to Figs. 2, 3 and 4, the wind simulating means generally indicated by the reference numeral 4, in Fig. 1, comprises a frame 15, having vertical legs supporting a chart holding table surface 16, which in turn supports the weight of the course indicator 5. The table surface 16, has one side of an endless belt 17, passing thereover, the width of the belt being considerably smaller than the width of the table 16. The belt 17 is preferably made of transparent material and passes over each of a pair of driving rollers 18 and 18', respectively rotatably mounted on the frames 23 and 23', located at opposite ends of the table 16. The frames 23 and 23' are provided with dovetails 24 and 24', which fit into corresponding grooves cut in the supports 25 and 25', which are in turn secured to the frames 15, at opposite ends of the table 16. The dovetail and groove construction insures that the frames 23 and 23' are adequately supported by, yet freely transversely movable with respect to the supports 25 and 25', so that transverse movement of the frames 23 and 23' cause belt 17 to move transversely with respect to the table 16.

The rollers 18 and 18' are provided with teeth 20 and 20', which mesh with corresponding spaced perforations at the edges of the belt 17, so as to positively drive the belt. Each of the rollers 18 and 18' is provided at one end with a respective bevel gear 19 and 19', which meshes with a corresponding bevel gear 21 or 21', mounted on a corresponding shaft 22 or 22' journalled in the respective frames 23 and 23'. The shaft 22, at the left end of table 16, is driven by a flexible shaft 30, connected to a gear 31, mounted on a subframe 15' and the shaft 22', at the right end of the table 16, is driven by a flexible shaft 33, connected to a gear 32, which meshes with gear 31. The gear 31 is driven through reduction gearing including gears 34, 35, 36 and 37, from a shaft 38, which is journalled in a support 48. The shaft 38, is driven by a friction roller 39, keyed to the shaft 38 and axially slidable thereon and positionally controlled by a fork 44, manually shifted by a rod 45, having a knob and pointer 46, at the end thereof. The roller 39, is adapted to be driven by a friction disc 40, held in contact with the roller 39, by a spring 42. The disc 40, is mounted on a vertical shaft 41, having a bevel gear 43, mounted on the lower end meshing with a gear 50, mounted on a shaft 51. The shaft 51, has a second bevel gear 52, mounted on its other end, which meshes with bevel gear 53, mounted on the lower end of a vertical shaft 54, which is driven by bevel gears 55 and 56, from an electric motor 57, which runs at a fixed speed. The electric motor 57, thus drives the friction disc 40, at a constant speed in one direction and by shifting the roller 39, to the right, or left of the center position on disc 40, the speed of shaft 38, may be varied from zero to a maximum value, in either direction of rotation. The shaft 38, will drive gears 31 and 32, flexible shafts 30 and 33 and gears 21 and 21' respectively, in opposite directions, but due to the fact that the gears 21 and 21', mesh with the corresponding roll driving gears 19 and 19', on opposite sides of the centers of rotation of rolls 18 and 18', at the respective ends of the table 16, the rolls 18 and 18' will each rotate in the same direction and thus drive belt 17. Reversal of the drive of shaft 38, reverses the direction of motion of belt 17 and the velocity of the belt can be varied in either direction from zero to a maximum value, through adjustment of roller 39, by setting manual control rod 45.

The means for imparting transverse motion to the frames 23 and 23', is constructed as follows: The vertical shaft 54, driven by motor 57, has a spring loaded friction disc 60, mounted on the upper end thereof and the disc engages a friction roller 61, slidably keyed to a shaft 62. The shaft 62, is journalled in a support 63 and the roller 61, is axially shiftable on the shaft 62, by means of a fork 64, actuated by a manual control rod 65, having an actuating knob and pointer 66, secured to the outer end thereof. The shaft 62, through reduction gears 68, 69, 70 and 71, drives a pair of gears 72 and 73, in opposite directions. The gear 73, drives a shaft 74, which through a bevel gear drive 75 and 76, drives a vertical shaft 77, which through bevel gears 78 and 79, drives a worm 80, rotatably mounted in a suitable bracket supported by the stationary frame 25. The worm 80, engages a rack 81, secured to the frame 23 and rotation of the worm causes a transverse movement of the frame 23, relative to the frame 25, in either direction of movement, depending on the setting of the friction roller 61, with respect to the center of friction disc 60 and at a velocity dependent on the radial distance of roller 61, from the center of friction disc 60.

The frame 23', is driven from the gear 72, by means of a universally jointed shaft 72', shaft 74', bevel gears 75' and 76', vertical shaft 77', bevel gears 78' and 79', worm 80' and rack 81', in exactly the same manner as above described with respect to frame 23. It is thus seen that the frames 23 and 23', which support rollers 18 and 18', respectively, can be driven in unison in either of two directions at a desired velocity from zero to a maximum value and such transverse motion of the rollers causes an equal transverse displacement of the belt 17.

The belt 17 is slightly tensioned by means of rollers 85 and 85', each suitably mounted on a leaf spring secured to the respective frames 23 and 23'.

A wind scale 90 is mounted on the frame 25 and cooperates with the pointers associated with the control knobs 46 and 66, so that the transverse and longitudinal components of a desired simulated wind, may be readily adjusted.

*Operation*

As seen in Fig. 5, the longitudinal speed of the belt 17, may be considered as the component of the wind velocity in a north or south direction and its setting is determined by the adjustment of knob and pointer 46, opposite the desired velocity indicia on the wind scale 90, which as seen is 40 miles per hour. Setting the pointer 66, causes a transverse movement of the belt 17, in a direction indicated as east or west and as indicated in Fig. 5, is 10 miles per hour west and the resultant wind will then have a value of 41.4 miles per hour with an azimuth heading of 347° from north. The velocity of a point on the belt 17, will then be proportional to the assumed simulated wind of 41.4 miles per hour and when the course indicator 5 is placed on the belt 17 and the indicator and trainer are placed in operation, the course indicator will be bodily displaced by the belt 17 in the direction of the simulated wind, irrespective of its own motion relative to the stationary table 16, at a velocity proportional in some predetermined scale, to the simulated wind velocity. If now it be assumed, that the course indicator 5, is moving along a heading determined by the trainer 1, at a velocity proportional to the simulated air speed of the trainer, the actual course of the indicator relative to the table 16, will include the effect of the simulated wind and in order to make good a desired course between two points on the reference chart, which may be placed on the table 16, the student must change the trainer heading to compensate for the drift effect produced by the wind simulating means. The student calculates the drift angle from the known simulated air velocity of the trainer and the known direction and velocity of the simulated wind and accordingly alters the trainer heading by the amount of the drift angle. The instructor may set the value and direction of the simulated wind, such that the resultant wind lies in any quadrant and is of a desired magnitude. The instructor then imparts the wind velocity and direction to the student, who must then solve the navigation problem with the wind to be considered as an element. Pure head winds, tail winds, or cross winds may be simulated with the above described device by suitable adjustment of the friction drives for the rollers 18 and 18', and transverse frames 23 and 23', in the manner above described. By adjustment of either friction roller 39 or 61, to the center position of the respective friction discs 40 and 60, the longitudinal or transverse motion of the belt 17, may be stopped.

The instructor may watch the course of the indicator relative to the chart placed on the surface of the table 16, the transparent belt 17, passing over the chart. The instructor may then give the proper simulated radio signal to indicate the position of the indicator relative to a simulated radio range, or radio compass station point on the chart on the table 16, or the signal may be given by automatic means, such as disclosed in my aforementioned copending application Serial No. 327,003.

While I have disclosed one form of the invention it will be apparent to those skilled in the art, that other modifications may be made falling within the scope of the invention as defined by the appended claims.

I claim:

1. In combination, a record table, a course indicator for an aviation ground trainer movable relative to said record table to simulate the flight course of an aircraft, a movable surface for supporting said indicator on said record table, means for displacing said surface in either direction longitudinally with respect to said table and separate means for displacing said surface transversely in either direction with respect to said table, each of said means being severally or simultaneously operable.

2. The structure as claimed in claim 1, in which the said movable surface is a belt.

3. The structure as claimed in claim 1, in which the said movable surface is a transparent belt.

4. The structure as claimed in claim 1, in which each of said means includes a reversible variable speed drive and a manual means for controlling the direction and speed ratio of said drive.

5. The structure as claimed in claim 1, in which each of said means includes a reversible variable speed drive adjustable to displace said surface at a velocity within a range from zero to a predetermined maximum in either direction of motion.

6. In combination, a record table, a course indicator having a recording element for an aviation ground trainer universally pivotally mounted for movements simulating the flight course movements of an aircraft, a movable surface for supporting said indicator on said record table, means for displacing said surface in either direction longitudinally with respect to said table and separate means for displacing said surface transversely in either direction with respect to said table, each of said means being severally or simultaneously operable, movement of said recording element being at least in part controlled by movement of said trainer.

7. In combination, a record table, a course indicator having a recording element for an aviation ground trainer, said trainer universally pivotally mounted for movements simulating the flight course movements of an aircraft, a movable surface for supporting said indicator on said record table, means for displacing said surface in either direction longitudinally with respect to said table, and separate means for displacing said surface transversely in either direction with respect to said table, each of said means being severally or simultaneously operable, movement of said recording element being at least in part controlled by movement of said trainer, the said movable surface being a belt.

CARL J. CRANE.

REFERENCES CITED

The following references are of record in the file of this patent:

UNITED STATES PATENTS

| Number | Name | Date |
|---|---|---|
| 1,596,936 | Mengden | Aug. 24, 1926 |
| 1,701,582 | Mengden | Feb. 12, 1929 |
| 1,745,933 | Kauch | Feb. 4, 1930 |
| 1,825,462 | Link | Sept. 29, 1931 |
| 1,985,266 | Smith | Dec. 25, 1934 |
| 2,099,857 | Link | Nov. 23, 1937 |
| 2,164,412 | Koster | July 4, 1939 |
| 2,179,663 | Link | Nov. 14, 1939 |

FOREIGN PATENTS

| Number | Country | Date |
|---|---|---|
| 384,971 | Great Britain | 1931 |